United States Patent
Borkar et al.

(10) Patent No.: US 11,140,163 B2
(45) Date of Patent: Oct. 5, 2021

(54) USER AUTHENTICATION SYSTEMS AND METHODS

(71) Applicant: Mastercard International Incorporated, Purchase, NY (US)

(72) Inventors: Vijaykumar Vamanrao Borkar, Maharashtra (IN); Shweta Gupta, Primpri Chinchwad (IN); Sachin Kumar Agarwalla, Miami, FL (US); Ajay Bahadur Singh Panwar, Maharashtra (IN); Arunmurthy Gurunathan, Maharashtra (IN)

(73) Assignee: Mastercard International Incorporated, Purchase, NY (US)

( * ) Notice: Subject to any disclaimer, the term of this patent is extended or adjusted under 35 U.S.C. 154(b) by 24 days.

(21) Appl. No.: 16/217,814

(22) Filed: Dec. 12, 2018

(65) Prior Publication Data

US 2019/0222576 A1  Jul. 18, 2019

(30) Foreign Application Priority Data

Jan. 15, 2018  (SG) .............................. 10201800338T

(51) Int. Cl.
*H04L 29/06* (2006.01)
*G06Q 20/40* (2012.01)
(Continued)

(52) U.S. Cl.
CPC ......... *H04L 63/0884* (2013.01); *G06Q 20/40* (2013.01); *H04L 63/0838* (2013.01);
(Continued)

(58) Field of Classification Search
CPC ............. G06Q 20/40; G06Q 20/40145; G06Q 20/3224; G06Q 20/405; G06Q 20/401
(Continued)

(56) References Cited

U.S. PATENT DOCUMENTS 8,494,961 B1 * 7/2013 Lucas .................. G07F 19/207
705/43
8,572,701 B2 * 10/2013 Rathbun ............. H04L 63/0853
726/6
(Continued)

FOREIGN PATENT DOCUMENTS

JP  2013-073416 A1  4/2013

OTHER PUBLICATIONS

User Authentication Using Mobile Phones for Mobile Payment Soonhwa Sung IEEE (Year: 2015).*
(Continued)

*Primary Examiner* — William E Rankins
(74) *Attorney, Agent, or Firm* — Buckley, Maschoff & Talwalkar LLC

(57) ABSTRACT

Data processing systems and methods for authenticating users are disclosed. In one embodiment a data processing system for authenticating a user of a device comprises: a computer processor and a data storage device, the data storage device storing instructions operative by the processor to: determine authentication capabilities of the device, the authentication capabilities of the device comprising one or more authentication methods; determine a set of authentication options using the authentication capabilities of the device; send an indication of the set of authentication options to the device; receive an indication of a user selected authentication method from the device; generate an authentication data request corresponding to the user selected authentication method; send the authentication data request to the device; receive an authentication response from the device; and authenticate the user using the authentication response.

14 Claims, 9 Drawing Sheets

(51) Int. Cl.
*H04W 12/06* (2021.01)
*G06Q 20/30* (2012.01)
*H04W 12/67* (2021.01)

(52) U.S. Cl.
CPC ......... *H04L 63/0861* (2013.01); *H04W 12/06* (2013.01); *G06Q 20/30* (2013.01); *H04L 63/205* (2013.01); *H04W 12/068* (2021.01); *H04W 12/67* (2021.01)

(58) Field of Classification Search
USPC .......................................................... 705/44
See application file for complete search history.

(56) References Cited

U.S. PATENT DOCUMENTS

| | | | | |
|---|---|---|---|---|
| 9,799,031 | B2* | 10/2017 | Trifiletti | G06Q 20/32 |
| 2002/0111919 | A1* | 8/2002 | Weller | G06Q 20/341 |
| | | | | 705/67 |
| 2013/0095789 | A1* | 4/2013 | Keevill | H04W 12/0609 |
| | | | | 455/411 |
| 2013/0198081 | A1 | 8/2013 | Royyuru et al. | |
| 2014/0289833 | A1* | 9/2014 | Briceno | H04L 63/08 |
| | | | | 726/7 |
| 2015/0142669 | A1* | 5/2015 | Landrok | G06Q 20/363 |
| | | | | 705/71 |
| 2015/0294313 | A1* | 10/2015 | Kamal | G06Q 20/401 |
| | | | | 705/44 |
| 2016/0087952 | A1* | 3/2016 | Tartz | G06F 21/32 |
| | | | | 455/411 |
| 2016/0087957 | A1* | 3/2016 | Shah | H04L 63/08 |
| | | | | 726/1 |
| 2016/0210626 | A1* | 7/2016 | Ortiz | G06Q 20/023 |
| 2017/0148009 | A1* | 5/2017 | Perez Lafuente | H04L 63/0846 |
| 2017/0286648 | A1 | 10/2017 | Yamaguchi et al. | |
| 2018/0293579 | A1* | 10/2018 | Tetali | G06Q 20/3224 |

OTHER PUBLICATIONS

"PCT Notification of Transmittal of the International Search Report and the Written Opinion", International Searching Authority, dated Feb. 26, 2019 (dated Feb. 26, 2019), International Application No. PCT/US2018/062706, 10 pp.

* cited by examiner

USER AUTHENTICATION SYSTEMS AND METHODS

CROSS-REFERENCE TO RELATED APPLICATION

This application is a U.S. National Stage filing under 35 U.S.C. § 119, based on and claiming benefits of and priority to Singapore Patent Application No. 10201800338T filed on Jan. 15, 2018. The entire disclosure of the above application is incorporated herein by reference for all purposes.

FIELD

The present disclosure relates to systems and methods for authenticating users. In particular, the present disclosure relates to authentication of a user of an electronic device.

BACKGROUND

The use of electronic commerce is becoming increasingly widespread. There is a wide range of user devices though which electronic commerce is carried out. For example, a user may access an on-line merchant though an application on a smart phone or tablet device, and through a website using a desktop or laptop personal computer. It is anticipated that in the future the range of devices though which electronic commerce may be carried out will become more varied with devices such as virtual reality headsets and smart watches being used to conduct electronic commerce.

When a user visits a website to conduct electronic commerce, generally the process involves the user selecting one or more items to purchase and these items are placed in a virtual shopping trolley. Once the user has completed their selection, the user selects a check-out option and they are directed to a payment page. On the payment page the user enters payment card details and other information such as delivery options for the items to be purchased. Then the user may be redirected to a further page in which an additional authentication is carried out. This page may require the user to enter an internet PIN (personal identification number) or other type of previously set password. In some cases, a one-time password (OTP) may be sent to a device registered to the user. Generally such pages provide static authentication methods to the user. This may cause a problem, if the user does not have access to the device registered to receive the OTP, or if the device does not have a network connection. Further, if the user has forgotten their PIN or password then they may not be able to complete the purchase.

SUMMARY

In accordance with a first aspect of the present disclosure there is provided a data processing system for authenticating a user. The data processing system comprises: a computer processor and a data storage device, the data storage device storing instructions operative by the processor to: determine authentication capabilities of the device, the authentication capabilities of the device comprising one or more authentication methods; determine a set of authentication options using the authentication capabilities of the device; send an indication of the set of authentication options to the device; receive an indication of a user selected authentication method from the device; generate an authentication data request corresponding to the user selected authentication method; send the authentication data request to the device; receive an authentication response from the device; and authenticate the user using the authentication response.

In an embodiment, the data storage device stores further instructions operative by the processor to: determine authentication preferences for the authentication request, the authentication preferences indicating one or more allowable authentication methods, and to determine the set of authentication options using the authentication capabilities of the device by selecting a set of allowable authentication method from the authentication capabilities of the device.

In an embodiment, the data storage device stores further instructions operative by the processor to: determine authentication preferences for the authentication request using information contained within the authentication request to determine the authentication preferences.

In an embodiment, the authentication request is an authentication request for a payment transaction request and the information contained within the authentication request comprises an indication of an attribute associated with a transaction. The attribute associated with the transaction may be a transaction amount.

In an embodiment, the data storage device stores further instructions operative by the processor to: receive device context information from the device, the device context information indicating authentication capabilities of the device, and to determine authentication capabilities of the device by analyzing the device context information.

In an embodiment, the data storage device stores further instructions operative by the processor to: determine authentication capabilities of the device by looking up stored indications of authentication capabilities of the device.

In an embodiment, the selected authentication method comprises a biometric authentication method, the authentication data comprises biometric data of the user and wherein the data storage device stores further instructions operative by the processor to: authenticate the user using the authentication response by comparing the biometric data of the user with stored biometric data for the user.

In an embodiment, the one or more authentication methods comprise generating a one-time password to be sent to a device associated with the user, and/or validating stored password data input into the device by the user.

According to a second aspect of the present disclosure there is provided a method of authenticating a user. The method comprises: receiving an authentication request from the device; determining authentication capabilities of the device, the authentication capabilities of the device comprising one or more authentication methods; looking up an authentication profile associated with the user and/or the device; determining a set of authentication options using the authentication capabilities of the device and the authentication profile; sending an indication of the set of authentication options to the device; receiving an indication of a user selected authentication method from the device; generating an authentication data request corresponding to the user selected authentication method; sending the authentication data request to the device; receiving an authentication response from the device; and authenticating the user using the authentication response.

In an embodiment, the method further comprises: receiving a second authentication request of the user from a second device; determining authentication capabilities of the second device, the authentication capabilities of the second device comprising one or more authentication methods; determining a second set of authentication options using the authentication capabilities of the second device; sending an indication of the second set of authentication options to the second device; receiving an indication of a second user selected authentication method from the second device; generating a second authentication data request corresponding to the second user selected authentication method; sending the second authentication data request to the second device; receiving a second authentication response from the second device; and authenticating the user using the second authentication response.

According to a third aspect of the present invention, a method of generating a payment transaction authentication request on a user device is provided. The method comprises: receiving user input indicating at least one item to be purchased; determining a transaction amount for the at least one item to be purchased; receiving a user input indicating a payment card; determining authentication capabilities of the device, the authentication capabilities of the device comprising one or more authentication methods; and generating a transaction authentication request, the transaction authentication request comprising an indication of the transaction amount, an indication of the payment card and an indication of the authentication capabilities of the device.

Embodiments of the invention may be expressed as a network of communicating devices (i.e. a "computerized network"). It may further be expressed in terms of a software application downloadable into a computer device to facilitate the method. The software application may be a computer program product, which may be stored on a non-transitory computer-readable medium on a tangible data-storage device (such as a storage device of a server, or one within a user device).

BRIEF DESCRIPTION OF THE DRAWINGS

Embodiments of the invention will now be described by way of example only with reference to the following drawings, in which.

DETAILED DESCRIPTION

Figure 1:
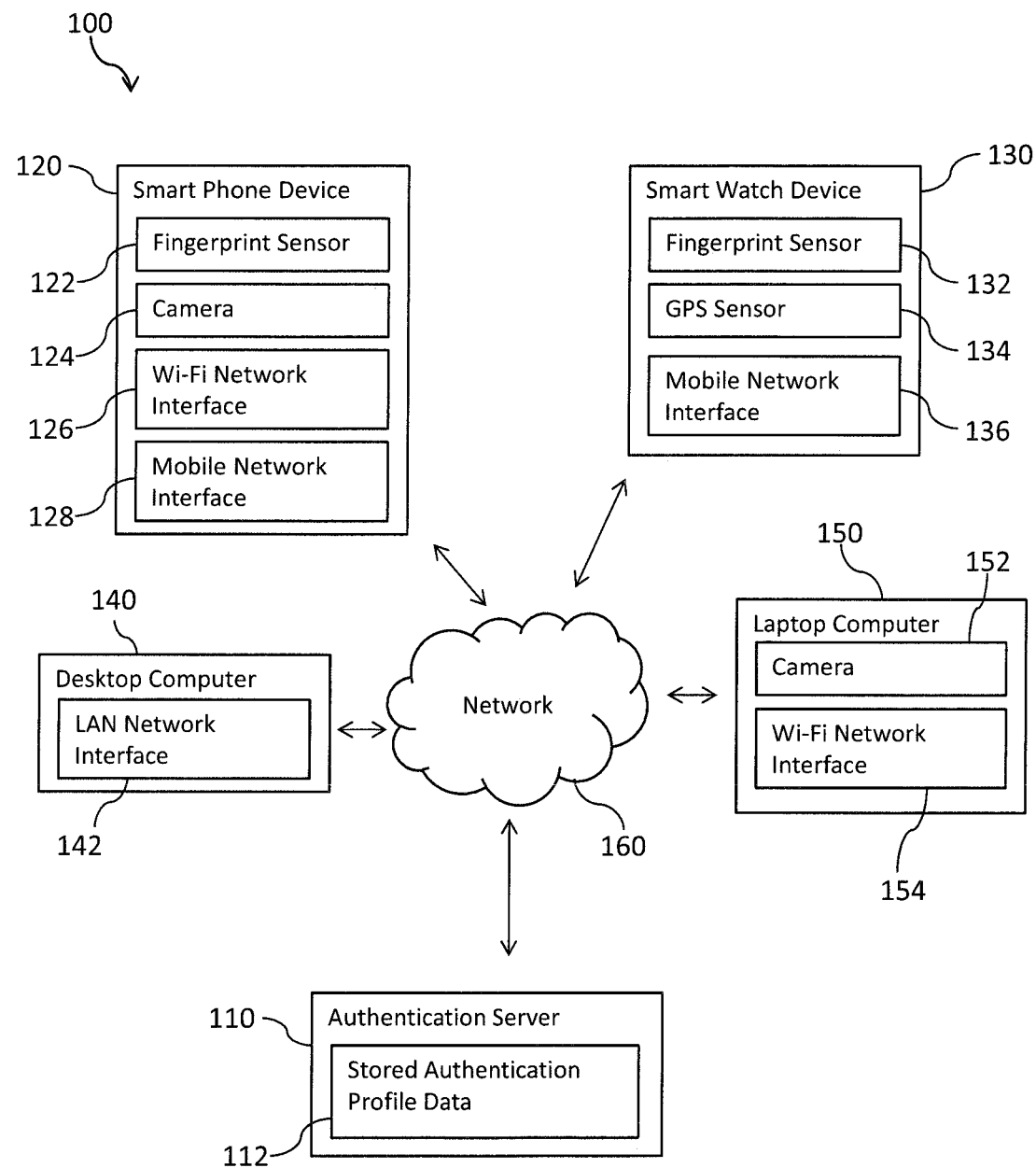
FIG. 1 is a block diagram showing an authentication system according to an embodiment of the present invention.

FIG. 1 is a block diagram showing an authentication system according to an embodiment of the present invention. As shown in FIG. 1, the system 100 comprises an authentication server 110 which is operable to authenticate users. The authentication of the users may, for example, form part of a payment transaction authorization process or may alternatively be part of an access authorization request to access either a physical location or a computer system. The authentication server 110 comprises storage for stored authentication profile data 112.

As shown in FIG. 1, a variety of devices can connect to the authentication server 110 to authenticate the user. The different devices have different authentication capabilities. In the embodiment shown in FIG. 1, the devices comprise a smart phone device 120, a smart watch device 130, a desktop computer 140 and a laptop computer 150. The smart phone device 120 comprises a fingerprint sensor 122, a camera 124, a Wi-Fi network interface 126 and a mobile network interface 128. The smart watch device 130 comprises a fingerprint sensor 132, a global positioning system (GPS) sensor 134 and a mobile network interface 136. The desktop computer 140 comprises a local area network (LAN) network interface 142. The laptop computer 150 comprises a camera 152 and a Wi-Fi network interface 154. Each of the smart phone device 120, the smart watch device 130, the desktop computer 140 and the laptop computer 150 can connect to the authentication server 110 via a network 160. The connections between the various devices and the network may be wired or wireless network connections depending on the connectivity of the respective devices.

The different devices described above have different authentication capabilities corresponding to different authentication methods. For example, the fingerprint sensor 122 of the smart phone device 120 and the fingerprint sensor 132 of the smart watch device 130 allow biometric authentication by comparing a fingerprint captured on the respective device with biometric data stored on the authentication server 110. The smart phone device 120 and the laptop computer 150 allow authentication through facial recognition using images captured on the camera of the respective device. The devices may also allow password based authentication by comparing a password entered on one of the devices with a password stored as part of the authentication profile data 112 stored by the authentication server 110. One-time password based authentication may also be possible using some of the devices, for example, the stored authentication profile data 112 may comprise an indication of a mobile telephone number associated with the smart phone device 120 to allow a one-time password to be sent to the user as part of the authentication process.

In some embodiments, the authentication process is used to authenticate a user as part of the authorization of a payment transaction. Alternatively, the authentication process may be used in other scenarios in which the identity of a user must be authenticated, for example to log in to a website or computer network or to access a physical location, for example through an electronically controlled door.

Figure 2:
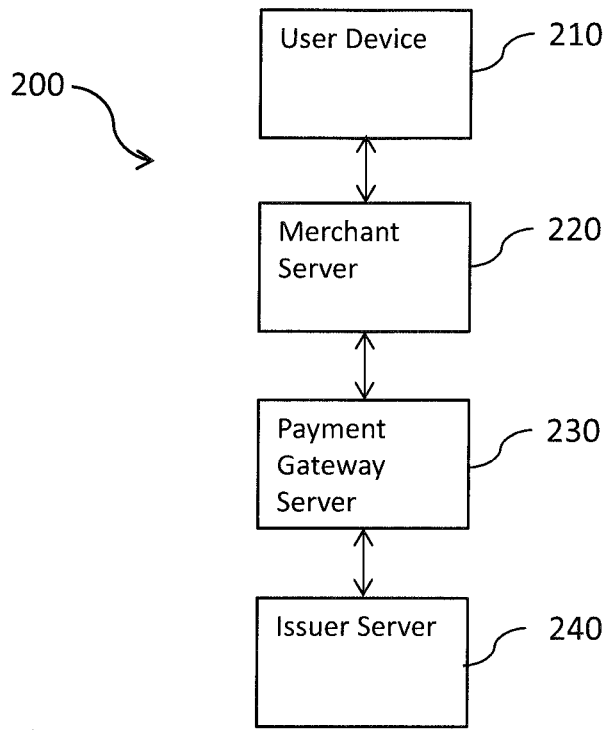
FIG. 2 is a block diagram showing an implementation of an embodiment of the present invention in an electronic commerce scenario.

FIG. 2 is a block diagram showing an implementation of an embodiment of the present invention in an electronic commerce scenario. In the scenario shown in FIG. 2, the user of a user device 210 opens a website provided by a merchant through a merchant server 220. The user device 210 may be one of the smart phone device 120, the smart watch device 130, the desktop computer 140, and the laptop computer 150 described above with reference to FIG. 1. As described above, the user device 210 has certain authentication capabilities and the authentication capabilities depend on the nature of the device and also factors such as the current network connectivity of the user device 210.

The merchant server 220 is coupled by a network to a payment gateway server 230 which processes payment requests on behalf of the on-line merchant. The payment gateway server 230 is connected by a network to an issuer server 240. The issuer server 240 is associated with a payment card issuing organization such as a bank.

In the example shown in FIG. 2, the role of the authentication server is carried out by the issuer server 240. However, embodiments are envisaged in which other servers or entities perform the role of the authentication server.

Figure 3:
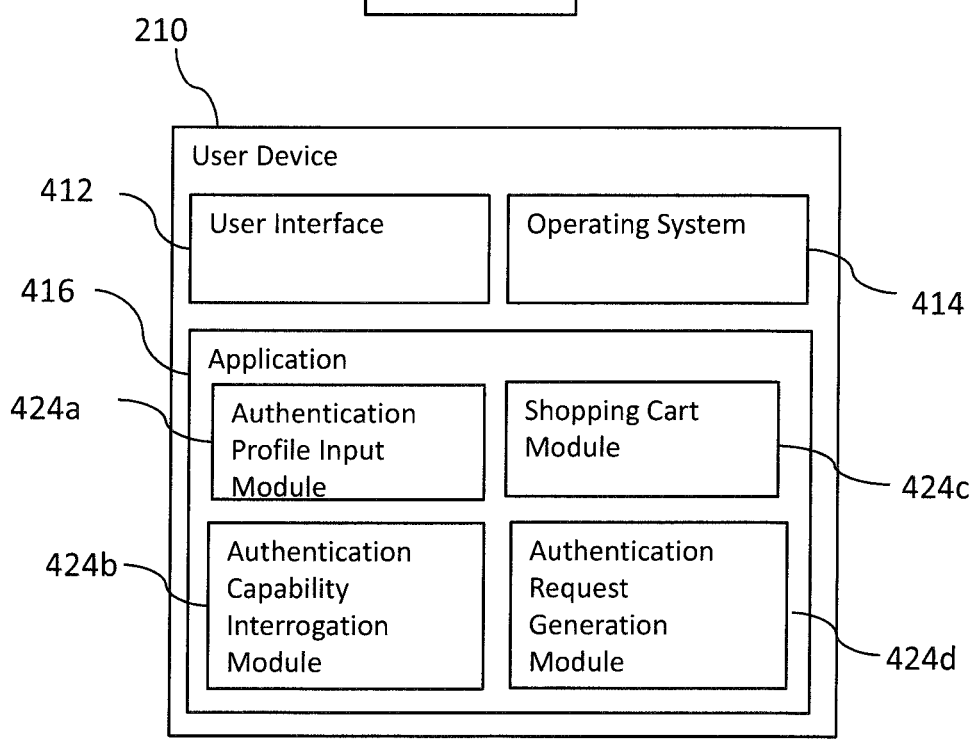
FIG. 3 is a block diagram showing the functional modules of user device of embodiments of the present invention.

FIG. 3 is a block diagram showing the functional modules of a user device 210 which may be one of the smart phone device 120, the smart watch device 130, the desktop computer 140, and the laptop computer 150 described above with reference to FIG. 1. The user device 210 comprises a user interface 412 which may be for example a touch screen, a keyboard or keypad, a mouse or trackpad, or other type of interface that allows a user to input commands and information. The user device 210 has an operating system 414 which controls the operation of the various functionalities of the user device 210 such as the authentication capabilities of the user device and the network connectivity of the user device. The operating system 214 may be, for example, the android operating system, the iOS operating system, or the windows operating system.

As shown in FIG. 3, the user device 210 runs an application 416 which may be a standalone application such as a smartphone app or may be a web browser which loads java modules or cookies. The application comprises four program modules: an authentication profile input module 424a; an authentication capability interrogation module 424b; a shopping cart module 424c; and an authentication request generation module 424d. The authentication profile input module 424a allows the user to input authentication profile data which is sent to the authentication server 110 for storage and use in the processing of authentication requests. The authentication capability interrogation module 424b is operable to interact with the operating system 214 to determine the available authentication capabilities of the user device 210. The shopping cart module 424c stores indications of items selected by the user for purchase during an electronic commerce session. The shopping card module 424c may calculate a price for a set of items selected by the user for purchase. The authentication request generation module 242d generates an authentication request which may form part of a transaction authentication request. A technical architecture of the user device is described in more detail below with reference to FIG. 10.

Figure 4:
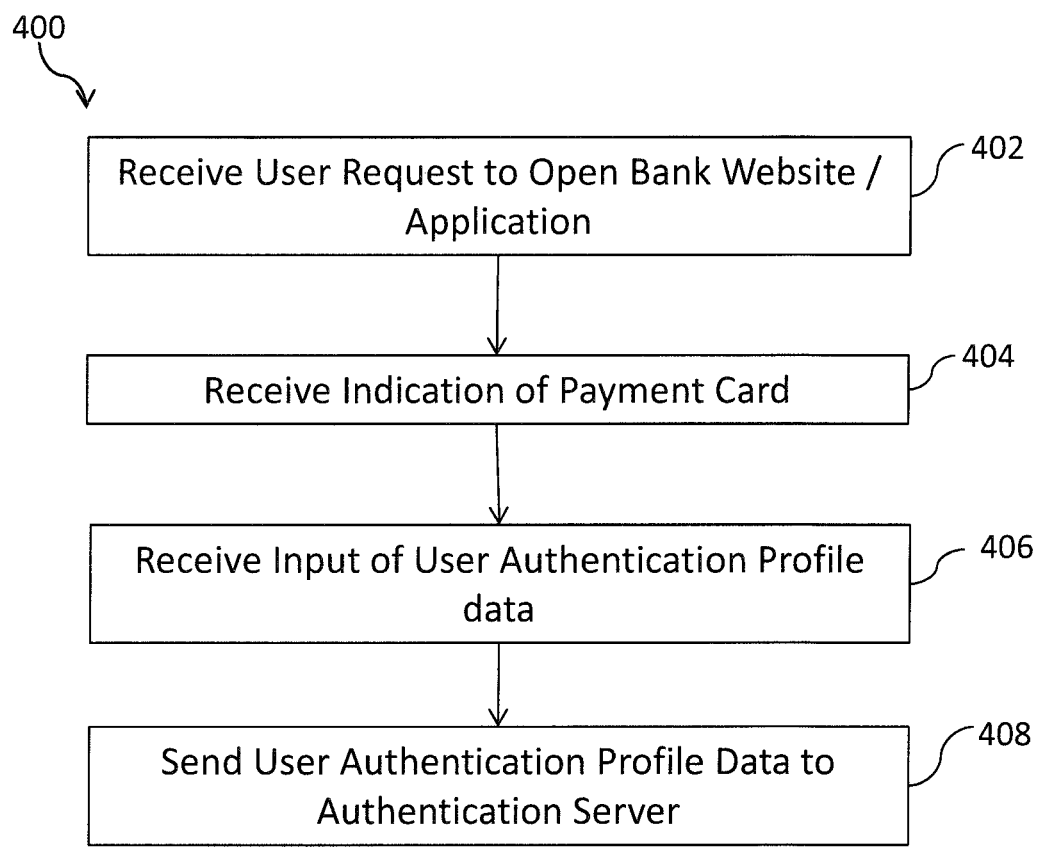
FIG. 4 is a flowchart showing a method of receiving user entry of authentication profile data on a user device in an embodiment of the present invention.

FIG. 4 is a flowchart showing method of receiving entry of user authentication profile data on a user device. The method 400 is carried out by the authentication profile input module 424a of the user device 210 shown in FIG. 3.

In step 402, a user request to open a bank website or application is received. The user may use the user interface 412 of the user device 210 to select a bank website or application and to enter login details such as a user name or customer number and password or other authentication information.

In step 404, an interaction of a payment card is received. The user may enter the payment card details directly or the user may be presented with a list of payment cards in their name at the bank.

In step 406, the user enters authentication profile data. In step 406, the user may be presented with authentication method options and for each selected option may be presented with a prompt to enter authentication profile data. For example, the user may be presented with the option of a one-time password (OTP) authentication option. On selecting this option, the user is presented with a prompt to enter a mobile telephone number and/or email address to which an OTP would be sent. The user may be presented with other options such as biometric authentication and in response to selecting these options the use may be prompted use a biometric sensor to input biometric data such as a fingerprint for use in authentication. The user may also be presented with the option to enter a password or responses to questions for use in authentication.

Once the user has completed entry of the authentication profile data, the authentication profile data is sent to the authentication server 110 where it is stored as stored authentication data 112.

Figure 5:
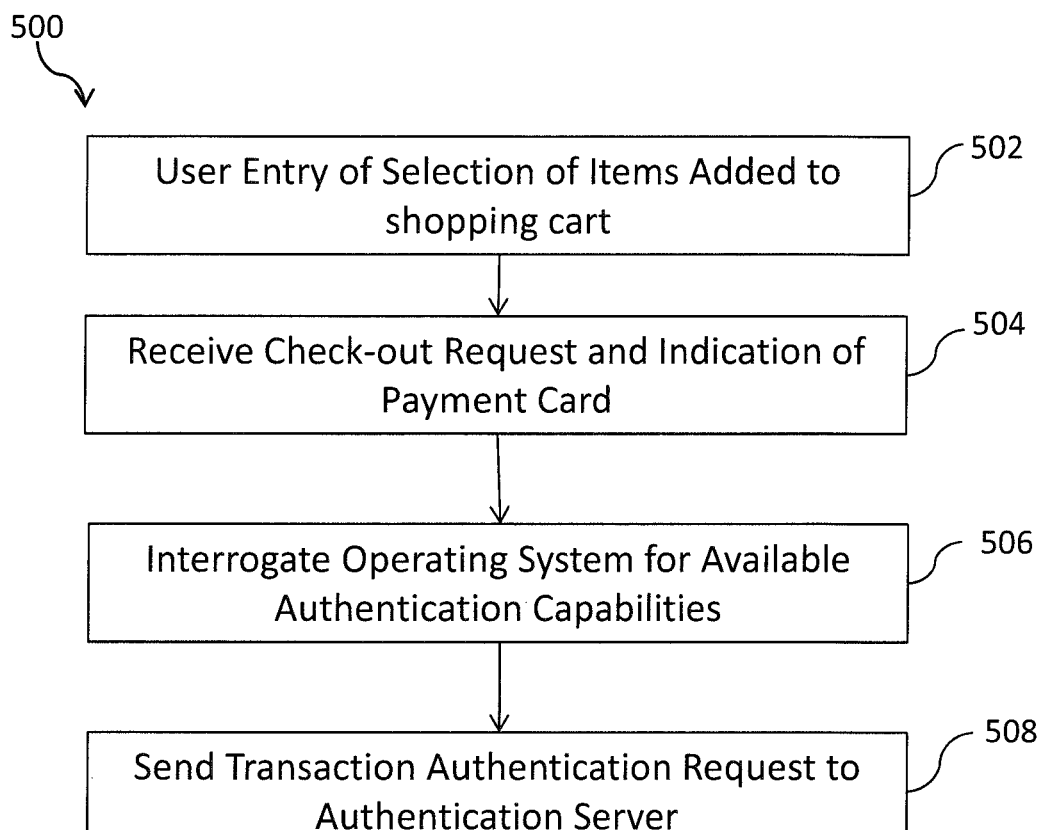
FIG. 5 is a flowchart showing a method of generating an authentication request according to an embodiment of the present invention.

FIG. 5 is a flowchart showing a method of generating a transaction authentication request on a user device according to an embodiment of the present invention. The method 500 is carried out the user device 210 shown in FIG. 3. The method 500 is implemented by an electronic commerce application on the user device or by the user accessing an electronic commerce website through a web browser on the user device 210

In step 502, a user selection of items for purchase is received and added to a shopping cart stored by the shopping cart module 424c. The user may input the selection though the user interface 412. The shopping cart module 424c may calculate a total price for the items selected the user.

In step 504, the user indicates that the selection of items is complete by selecting a "check-out" option which triggers a user prompt to enter delivery and payment details. In response to this user prompt, the user enters delivery details and inputs an indication of a payment card to be used for the payment.

The entry of the indication of the payment card triggers step 506 in which the authentication capability interrogation module 242b interacts with the operating system 414 of the user device 210 to determine the available authentication options. The authentication capability interrogation module may comprise a java module or cookie which will be loaded into the browser or on the application when it is used to access the website online or the online application. This java module or cookie will interact with the operating system 414 of user device 210 via the browser or the application 416 to fetch information on the available authentication methods such as whether there is network connectivity required for OTP authentication.

Figure 6:
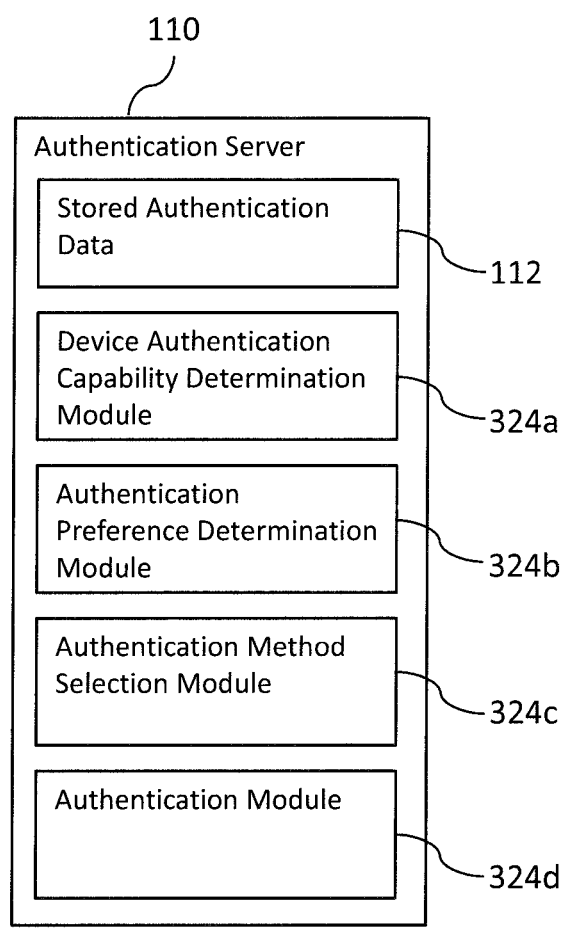
FIG. 6 is a block diagram showing the functional modules of the authentication server shown in FIG. 1.

In step 506, the authentication request generation module 424d generates an authentication request which may comprise an indication of the transaction amount, an indication of the payment card and an indication of the available authentication options on the user device 210. FIG. 6 is a block diagram showing the functional modules of the authentication server shown in FIG. 1, the authentication server may be implemented as the issuer server 240 shown in FIG. 2. As shown in FIG. 6, the authentication server 110 comprises stored authentication profile data 112, a device authentication capability determination module 324a; an authentication preference determination module 324b; an authentication method selection module 324c and an authentication module 324d. The device authentication capability determination module 324a may be operable to determine information on the available authentication methods for the user device 210 from an authentication request received from the user device. The authentication module 324d may be implemented to control functions of the user device 210 such as a camera or biometric reader to capture an image of the user and/or read biometric data of the user. A technical architecture of the authentication indication generation server is described in detail below with reference to FIG. 9.

Figure 7:
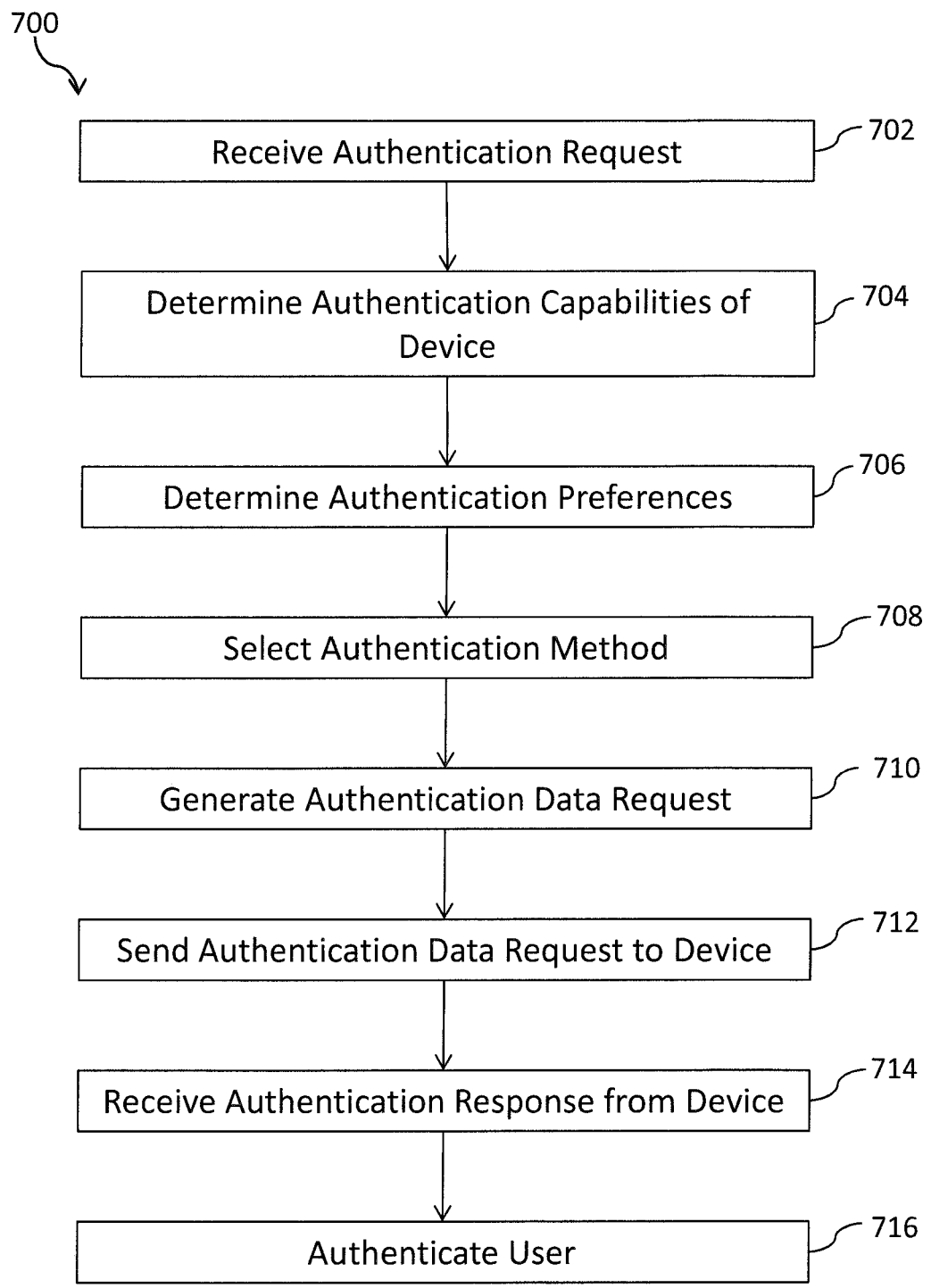
FIG. 7 is a flowchart illustrating a method of authenticating a user according to an embodiment of the present invention.

FIG. 7 is a flowchart illustrating a method of authenticating a user according to an embodiment of the present invention. The method 400 is carried out by the authentication server 110 illustrated in FIG. 6.

The method 700 shown in FIG. 7 may be implemented as part of a payment transaction at an on-line retailer. For example, in response to receiving the transaction authentication request generated in the method 500 described above in relation to FIG. 5. The user may log in to the website of an on-line retailer and select a set of products these steps are implemented by the merchant server 220 shown in FIG. 2. Once the user has completed the selection of products to purchase, they select a "check-out" option and are given options to make a payment. In response to the options, the user enters details of a payment card, this is implemented by the payment gateway server 230 shown in FIG. 2. In response to the entry of the payment card details they are redirected to an authentication server operated by the issuer of the payment card, these steps are implemented by the issuer server 240 shown in FIG. 2. This authentication server carries out the method described below.

In step 702, the authentication server 110 receives the authentication request. In the example shown in FIG. 2, the authentication request is received from the payment gateway server 230, and in other embodiments, the authentication request may be received directly from the user device or received from the merchant server 220 associated with the on-line retailer. The authentication request may include details of the transaction, for example, an indication of the transaction amount and an indication of the merchant corresponding to the on-line retailer.

In step 704, the authentication capability determination module 324*a* of the authentication server 110 determines the authentication capabilities of the device. The authentication capabilities may be determined from information received in the authentication request. For example, the authentication request may include indications of network availability for the user device. The authentication capabilities of the device may be determined from stored information on the authentication server 110. The authentication server 110 may store indications of authentication capabilities of the device. For example, as described above in relation to FIG. 4, the user may register the device as part of an activation process of the payment card. The authentication capabilities of the device may be determined in part from the stored authentication data 112, as it would be necessary that the user has set up the authentication method, for example by providing biometric data such as fingerprint data for use in biometric authentication.

As described above in relation to FIG. 5, an interrogation may be implemented as an application which runs on the user device such as a smart phone app provided by an on-line retailer, the payment card issuer or a digital wallet provider. This application may interrogate the operating system of the user device 210 to provide the indication of the authentication capabilities of the user device 210 as part of the transaction authentication request received in step 702.

In step 706, the authentication preference determination module 324*b* of the authentication server 110 determines authentication preferences for the transaction. The authentication preferences may be a selection by the issuer of the payment card. This selection may be dependent on the details of the transaction, for example if the transaction amount is above a threshold amount then more stringent authentication methods such as second factor authentication may be required by the issuer. Alternatively, or additionally, the authentication preferences may be a selection by the user. As part of the activation process, the user may indicate that certain authentication methods are preferred. The issuer server 240 may use a payment card identifier included in the payment transaction authorization request to identify the user and may use this information to look up a user profile indicating authentication preferences for the user.

In some embodiments, the authentication request, or the authentication capability information determined in step 704 may include location information, for example, location information of the user device 210.

As described above, in step 706, the authentication capability determination module 324*a* of the authentication server 110 accesses the stored authentication preferences for the user. Various embodiments are possible here: the user may have different authentication profiles—profile A for mobile phone—fingerprint, facial recognition, OTP etc., profile B for laptop—a password or PIN number, voice input etc. All option in profiles are the ones that the issuer server 240 supports. The user may have pre-registered such options.

In another embodiment, issuer server 240 may support one single profile for all devices based on the options supported by issuer server 240.

In yet another embodiment, there is no device profile at all, in such case, the authentication preferences may be determined from a user profile.

In step 708, the authentication method selection module 324*c* of the authentication server 110 selects an authentication method. In some embodiments step 708 may comprise the authentication method selection module determining two or more authentication methods which are an intersection of the authentication capabilities of the device and authentication preferences determined in step 706. In such an embodiment, the user may be presented with the two or more authentication methods and provide a selection of one of the authentication methods for the following steps of the authentication method.

In step 710, the authentication module 324*d* of the authentication server 110 generates an authentication data request. In step 712, the authentication data request is sent to the user device by the authentication server 110. In step 714, the authentication server 110 receives an authentication response from the user device. The authentication response comprises authentication data. The authentication data may comprise biometric data such as fingerprint data of the user. Alternatively, the authentication data may comprise data such as a password, passcode or memorable information entered by the user of the device.

In step 716, the authentication module 324*d* of the authentication server 110 authenticates the user using the authentication data. Step 716 may comprise comparing the authentication data with the stored authentication data 112.

One advantage of embodiments of the present invention is that if an authentication option is not available, for example, a one-time password (OTP) functionality which requires a mobile network to send a OTP to a mobile device will not be available to a user if there is no mobile network signal, that option is not presented to a user or attempted to be used. This saves both time and network resources since no text message relating to the OTP will be sent which saves resources and the user does not have request an alternative method. Similarly in a scenario in which a user has, for example, forgotten their password, the user can simply select an alternative authentication method from the options presented to them.

Figure 8:
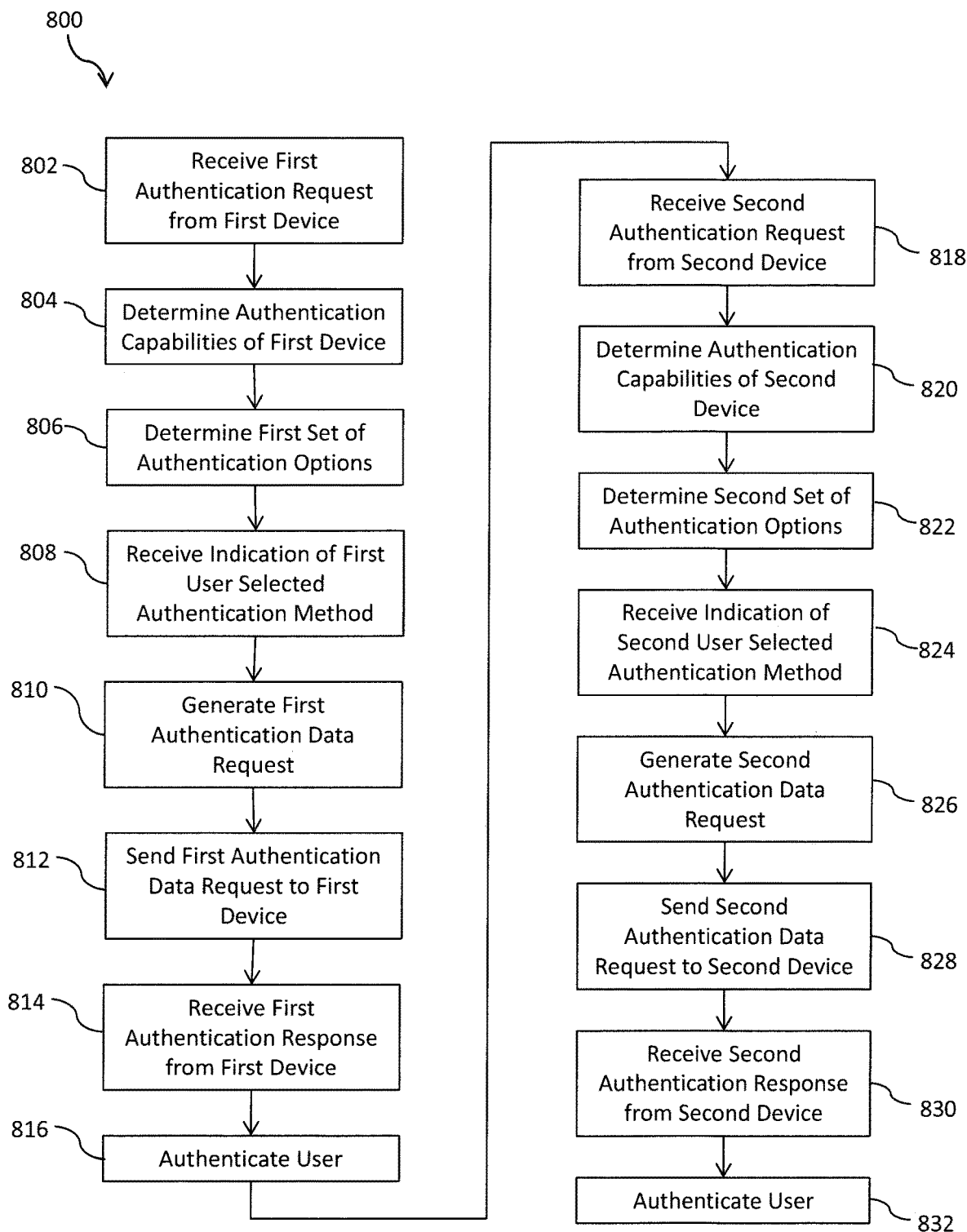
FIG. 8 is a flowchart illustrating a method of authenticating a user on a first user device and a second user device according to an embodiment of the present invention.

FIG. 8 is a flowchart showing a method of authenticating a user on a first user device and a second user device according to an embodiment of the present invention. In this example method 800, a user is first authenticated from one device and is then authenticated from a second device.

In step 802, the authentication server 110 receives a first authentication request from the user of the first device. The first authentication request may be received from the first user device or may be relayed by, for example, a merchant server and/or a payment gateway server. The first authentication request may comprise an indication of the authentication capabilities of the first device. In this example the first device is a smart phone device such as device 120 shown in FIG. 1 Thus the authentication capabilities of the first device are fingerprint authentication, facial recognition authentication via the camera 124 of the smart phone device 120, and OTP authentication via the mobile interface 128 of the smart phone device 128. This information may be determined by a cookie or java plugin running on the smart phone device 120.

In step 804, the device authentication capability determination module 324a of the authentication server 110 determines the authentication capabilities of the first device. As mentioned above, this information may be included in the authentication request received by the authentication server 110. Alternatively, the authentication server 110 may interrogate the first user device in response to receiving the first authentication request.

In step 806, the authentication preference determination module 324b of the authentication server 110 determines a first set of authentication options. This determination may be based on user preferences stored on the authentication server 110, and/or may be based on issuer preferences or rules specified by the issuer of the payment card associated with the authentication request. For example, the rules may specify that certain types of authentication must be used for transactions above a threshold amount such as 100 USD. The rules may specify other circumstances in which specific types of authentication must be used, for example authentication requests relating to merchants having a high risk of fraud.

Following step 806, an indication of the first set of authentication options is sent to the first user device. The user is then presented with an indication of the first set of authentication options and makes a selection of one of the options. This selection is transmitted to the authentication server 110.

In step 808, the authentication server 110 receives an indication of a first user selected authentication method with which the user is to be authenticated on the first user device. In this example, the user selects a one-time password authentication.

In step 812, the authentication module 324c of the authentication server 110 sends a text message containing an OTP code to the registered mobile number telephone of the user. Then the authentication module 324c of the authentication server 110 sends a first authentication data request to the first user device. In this example this comprises a prompt to the user to enter the OTP code.

In step 814, the authentication server 110 receives a first authentication response from the first user device which in this example indicates the OTP code input by the user in response to the prompt.

In step 816, the authentication module 324c of the authentication server 110 authenticates the user by comparing the received OTP code with the OTP code sent to the registered mobile number telephone of the user.

Then, in step 818 the authentication server 110 receives a second authentication request from a second device of the user. In this example, the second device is the laptop computer 150 shown in FIG. 1. The second authentication request may comprise an indication of the authentication capabilities of the second device. In this example the authentication capabilities of the second device are facial recognition authentication via the camera 152 of the laptop computer 150 and password authentication. This information may be determined by a cookie or java plugin running on the laptop computer 150.

In step 820, the device authentication capability determination module 324a of the authentication server 110 determines the authentication capabilities of the second device.

In step 822, the authentication preference determination module 324b of the authentication server 110 determines a second set of authentication options. Following step 822, an indication of the second set of authentication options is sent to the second user device. The user is then presented with an indication of the second set of authentication options and makes a selection of one of the options. This selection is transmitted to the authentication server 110.

In step 824, the authentication server 110 receives an indication of a second user selected authentication method with which the user is to be authenticated on the first user device. In this example, the user selects facial recognition authentication.

In step 826, the authentication module 324c of the authentication server 110 generates a second authentication data request. In step 828 the second authentication data request is sent to the second user device. In this example this comprises a request to the camera 152 to capture an image of the user's face.

In step 830, the authentication server 110 receives a second authentication response from the second user device which in this example comprises an image of the user's face.

In step 832, the authentication module 324c of the authentication server 110 authenticates the user by comparing the received image with a stored image for the user.

In the method 800 described above in relation to FIG. 8, the same user is presented with different authentication options when using a different first device and second device. A further scenario is envisaged in which a first user and a second user are presented with different authentication options when using the same device. For example, two family members may share a tablet computing device, a laptop computer or desktop computer. The first user may set up OTP authentication, biometric authentication using facial recognition and password authentication on that device for authentication of payment transactions using a first payment card associated with the first user. A second user may set up biometric authentication using fingerprint and password authentication for a second payment card associated with the second user. The stored authentication profile data 112 stored on the authentication server would indicate the authentication methods available for the two users. In an analogous manner to the different authentication options presented in the method 800 for different devices, in a method in which the two users both use the same device, the first user and the second user may be presented with different authentication methods according to different stored authentication profile data.

Figure 9:
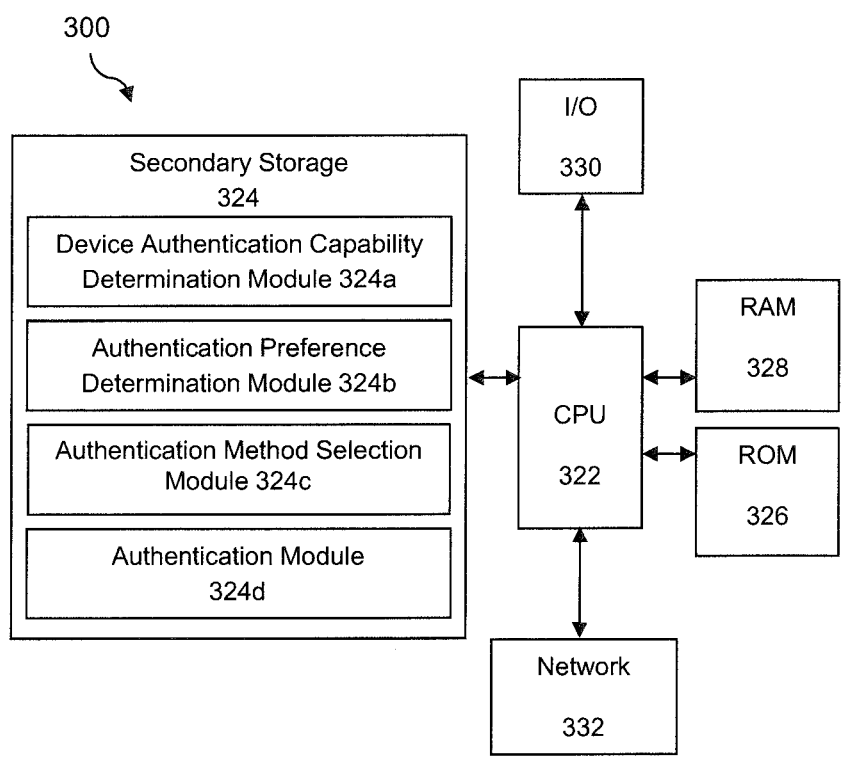
FIG. 9 is a block diagram showing a technical architecture of an authentication server according to an embodiment of the present invention.

FIG. 9 is a block diagram showing a technical architecture 300 of the authentication server 110 for performing steps of the methods described above. Typically, the methods are implemented by a number of computers each having a data-processing unit. The block diagram as shown in FIG. 9 illustrates a technical architecture 300 of a computer which is suitable for implementing one or more embodiments herein.

The technical architecture 300 includes a processor 322 (which may be referred to as a central processor unit or CPU) that is in communication with memory devices including secondary storage 324 (such as disk drives), read only memory (ROM) 326, random access memory (RAM) 328. The processor 322 may be implemented as one or more CPU chips. The technical architecture 300 may further comprise input/output (I/O) devices 330, and network connectivity devices 332.

The secondary storage 324 is typically comprised of one or more disk drives or tape drives and is used for non-volatile storage of data and as an over-flow data storage device if RAM 328 is not large enough to hold all working data. Secondary storage 324 may be used to store programs which are loaded into RAM 328 when such programs are selected for execution. In this embodiment, the secondary storage 324 has a device authentication capability determination module 324a; an authentication preference determination module 324b; an authentication method selection module 324c; and an authentication module 324d comprising non-transitory instructions operative by the processor 322 to perform various operations of the method of the present disclosure. As depicted in FIG. 9, the modules 324a-324d are distinct modules which perform respective functions implemented by the authentication server 110. It will be appreciated that the boundaries between these modules are exemplary only, and that alternative embodiments may merge modules or impose an alternative decomposition of functionality of modules. For example, the modules discussed herein may be decomposed into sub-modules to be executed as multiple computer processes, and, optionally, on multiple computers. Moreover, alternative embodiments may combine multiple instances of a particular module or sub-module. It will also be appreciated that, while a software implementation of the modules 324a-324d is described herein, these may alternatively be implemented as one or more hardware modules (such as field-programmable gate array(s) or application-specific integrated circuit(s)) comprising circuitry which implements equivalent functionality to that implemented in software. The ROM 326 is used to store instructions and perhaps data which are read during program execution. The secondary storage 324, the RAM 328, and/or the ROM 326 may be referred to in some contexts as computer readable storage media and/or non-transitory computer readable media.

The I/O devices may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 332 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 332 may enable the processor 322 to communicate with the Internet or one or more intranets.

With such a network connection, it is contemplated that the processor 322 might receive information from the network, or might output information to the network in the course of performing the method operations described herein. Such information, which is often represented as a sequence of instructions to be executed using processor 322, may be received from and outputted to the network, for example, in the form of a computer data signal embodied in a carrier wave.

The processor 322 executes instructions, codes, computer programs, scripts which it accesses from hard disk, floppy disk, optical disk (these various disk based systems may all be considered secondary storage 324), flash drive, ROM 326, RAM 328, or the network connectivity devices 332. While only one processor 322 is shown, multiple processors may be present. Thus, while instructions may be discussed as executed by a processor, the instructions may be executed simultaneously, serially, or otherwise executed by one or multiple processors.

It is understood that by programming and/or loading executable instructions onto the technical architecture 300, at least one of the CPU 322, the RAM 328, and the ROM 326 are changed, transforming the technical architecture 300 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Although the technical architecture 300 is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 300 to provide the functionality of a number of servers that is not directly bound to the number of computers in the technical architecture 300. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

Figure 10:
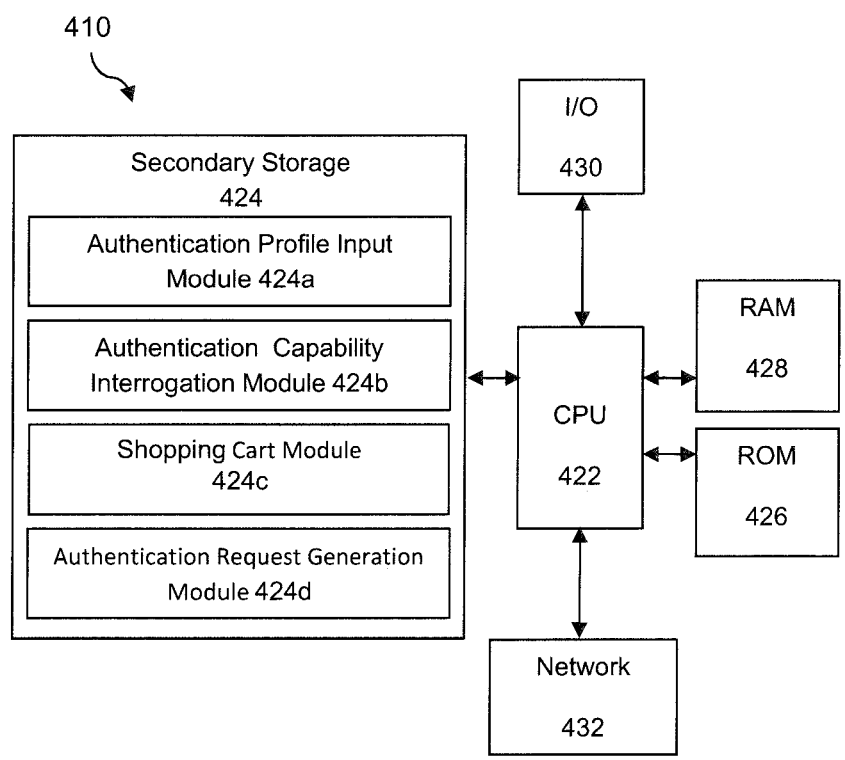
FIG. 10 is a block diagram showing a technical architecture of a user device according to an embodiment of the present invention.

FIG. 10 is a block diagram showing a technical architecture 410 of the user device 210 for performing steps of the methods described above. Typically, the methods are implemented by computer device having a data-processing unit. The block diagram as shown in FIG. 10 illustrates a technical architecture 410 of a computing device which is suitable for implementing one or more embodiments herein.

The technical architecture 410 includes a processor 422 (which may be referred to as a central processor unit or CPU) that is in communication with memory devices including secondary storage 424 (such as disk drives), read only memory (ROM) 426, random access memory (RAM) 428. The processor 422 may be implemented as one or more CPU chips. The technical architecture 410 may further comprise input/output (I/O) devices 430, and network connectivity devices 432.

The secondary storage 424 is typically comprised of one or more disk drives or tape drives and is used for non-volatile storage of data and as an over-flow data storage device if RAM 428 is not large enough to hold all working data. Secondary storage 424 may be used to store programs which are loaded into RAM 428 when such programs are selected for execution. In this embodiment, the secondary storage 424 has an authentication profile input module 424a; an authentication capability interrogation module 424b; shopping cart module 424c; and an authentication request generation module 424d comprising non-transitory instructions operative by the processor 422 to perform various operations of the method of the present disclosure. As depicted in FIG. 10, the modules 424a-424d are distinct modules which perform respective functions implemented by the user device 210. It will be appreciated that the boundaries between these modules are exemplary only, and that alternative embodiments may merge modules or impose an alternative decomposition of functionality of modules. For example, the modules discussed herein may be decomposed into sub-modules to be executed as multiple computer processes, and, optionally, on multiple computers. Moreover, alternative embodiments may combine multiple instances of a particular module or sub-module. It will also be appreciated that, while a software implementation of the modules 424a-424d is described herein, these may alternatively be implemented as one or more hardware modules (such as field-programmable gate array(s) or application-specific integrated circuit(s)) comprising circuitry which implements equivalent functionality to that implemented in software. The ROM 426 is used to store instructions and perhaps data which are read during program execution. The secondary storage 424, the RAM 428, and/or the ROM 426 may be referred to in some contexts as computer readable storage media and/or non-transitory computer readable media.

The I/O devices may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 432 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 432 may enable the processor 422 to communicate with the Internet or one or more intranets. With such a network connection, it is contemplated that the processor 422 might receive information from the network, or might output information to the network in the course of performing the method operations described herein. Such information, which is often represented as a sequence of instructions to be executed using processor 422, may be received from and outputted to the network, for example, in the form of a computer data signal embodied in a carrier wave.

The processor 422 executes instructions, codes, computer programs, scripts which it accesses from hard disk, floppy disk, optical disk (these various disk based systems may all be considered secondary storage 424), flash drive, ROM 426, RAM 428, or the network connectivity devices 432. While only one processor 422 is shown, multiple processors may be present. Thus, while instructions may be discussed as executed by a processor, the instructions may be executed simultaneously, serially, or otherwise executed by one or multiple processors.

It is understood that by programming and/or loading executable instructions onto the technical architecture 410, at least one of the CPU 422, the RAM 428, and the ROM 426 are changed, transforming the technical architecture 410 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Whilst the foregoing description has described exemplary embodiments, it will be understood by those skilled in the art that many variations of the embodiments can be made in accordance with the appended claims.

The invention claimed is:

1. A data processing system for authenticating a user of a user device, the data processing system comprising:
   a network;
   a user device of a user operably connected to the network; and
   an authentication server operably connected to the network, the authentication server comprising a computer processor and a data storage device, the data storage device storing instructions operative by the computer processor to:
     receive an authentication request via the network from the user device, wherein the authentication request concerns authenticating the identity of the user;
     determine authentication capabilities of the user device from information received in the authentication request, the authentication capabilities of the user device comprising one or more user authentication methods;
     determine authentication preferences associated with the user;
     determine a set of authentication options using the authentication capabilities of the user device and the authentication preferences associated with the user;
     send an indication of the set of authentication options via the network to the user device;
     receive an indication of a user selected authentication method via the network from the user device;
     generate an authentication data request responsive to the indication of the user selected authentication method;
     send the authentication data request via the network to the user device;
     receive an authentication response via the network from the user device; and
     authenticate the user using the authentication response.

2. A data processing system according to claim 1, wherein the data storage device stores further instructions operative by the computer processor to:
   determine the authentication preferences for the authentication request using information contained within the authentication request.

3. A data processing system according to claim 2, wherein the authentication request is an authentication request for a payment transaction request and the information contained within the authentication request comprises an indication of an attribute associated with a transaction.

4. A data processing system according to claim 3, wherein the attribute associated with the transaction is a transaction amount.

5. A data processing system according to claim 1, wherein the data storage device stores further instructions operative by the computer processor to:
receive device context information from the user device, the device context information indicating authentication capabilities of the user device, and
determine authentication capabilities of the user device by analyzing the device context information.

6. A data processing system according to claim 1, wherein the data storage device stores further instructions operative by the computer processor to:
determine authentication capabilities of the user device by looking up stored indications of authentication capabilities of the user device.

7. A data processing system according to claim 1, wherein the selected authentication method comprises a biometric authentication method, and wherein authentication data comprises biometric data of the user and wherein the data storage device stores further instructions operative by the computer processor to:
authenticate the user using the authentication response by comparing the biometric data of the user with stored biometric data for the user.

8. A data processing system according to claim 1, wherein the one or more authentication methods comprise at least one of generating a one-time password to be sent to a device associated with the user and validating stored password data input into the user device by the user.

9. A method of authenticating a user of a device, comprising:
receiving, by an authentication server, an authentication request from a user device, wherein the authentication request concerns authenticating the identity of the user;
determining, by the authentication server, authentication capabilities of the user device from information received in the authentication request, the authentication capabilities of the user device comprising one or more user authentication methods;
looking up, by the authentication server, an authentication profile associated with the user comprising authentication preferences of the user;
determining, by the authentication server, a set of authentication options using the authentication capabilities of the user device and the authentication preferences in the authentication profile;
sending, by the authentication server, an indication of the set of authentication options to the user device;
receiving, by the authentication server from the user device, an indication of a user selected authentication method;
generating, by the authentication server, an authentication data request responsive to the indication of the user selected authentication method;
sending, by the authentication server, the authentication data request to the user device;
receiving, by the authentication server, an authentication response from the user device; and
authenticating, by the authentication server, the user using the authentication response.

10. A method according to claim 9, wherein the authentication request is an authentication request for a payment transaction request and the information contained within the authentication request comprises an indication of an attribute associated with a transaction.

11. A method according to claim 9, further comprising receiving, by the authentication server, device context information from the user device, the device context information indicating authentication capabilities of the user device, and wherein determining authentication capabilities of the user device comprises analyzing, by the authentication server, the device context information.

12. A method according to claim 9, wherein the selected authentication method comprises a biometric authentication method, and wherein authentication data comprises biometric data of the user and authenticating the user using the authentication response comprises comparing, by the authentication server, the biometric data of the user with stored biometric data for the user.

13. A method according to claim 9, wherein the one or more authentication methods comprise generating, by the authentication server, at least one of a one-time password to be sent to the user device and validating stored password data input into the user device by the user.

14. A method according to claim 9, further comprising:
receiving, by the authentication server, a second authentication request of the user from a second user device;
determining, by the authentication server, authentication capabilities of the second user device, the authentication capabilities of the second user device comprising one or more authentication methods;
determining, by the authentication server, a second set of authentication options using the authentication capabilities of the second user device;
sending, by the authentication server, an indication of the second set of authentication options to the second user device;
receiving, by the authentication server, an indication of a second user selected authentication method from the second user device;
generating, by the authentication server, a second authentication data request corresponding to the second user selected authentication method;
sending, by the authentication server, the second authentication data request to the second user device;
receiving, by the authentication server, a second authentication response from the second user device; and
authenticating, by the authentication server, the user using the second authentication response.

* * * * *